ROBERT J. CARLSON
CORNELIS B. A. WICKENHAGEN
INVENTORS.

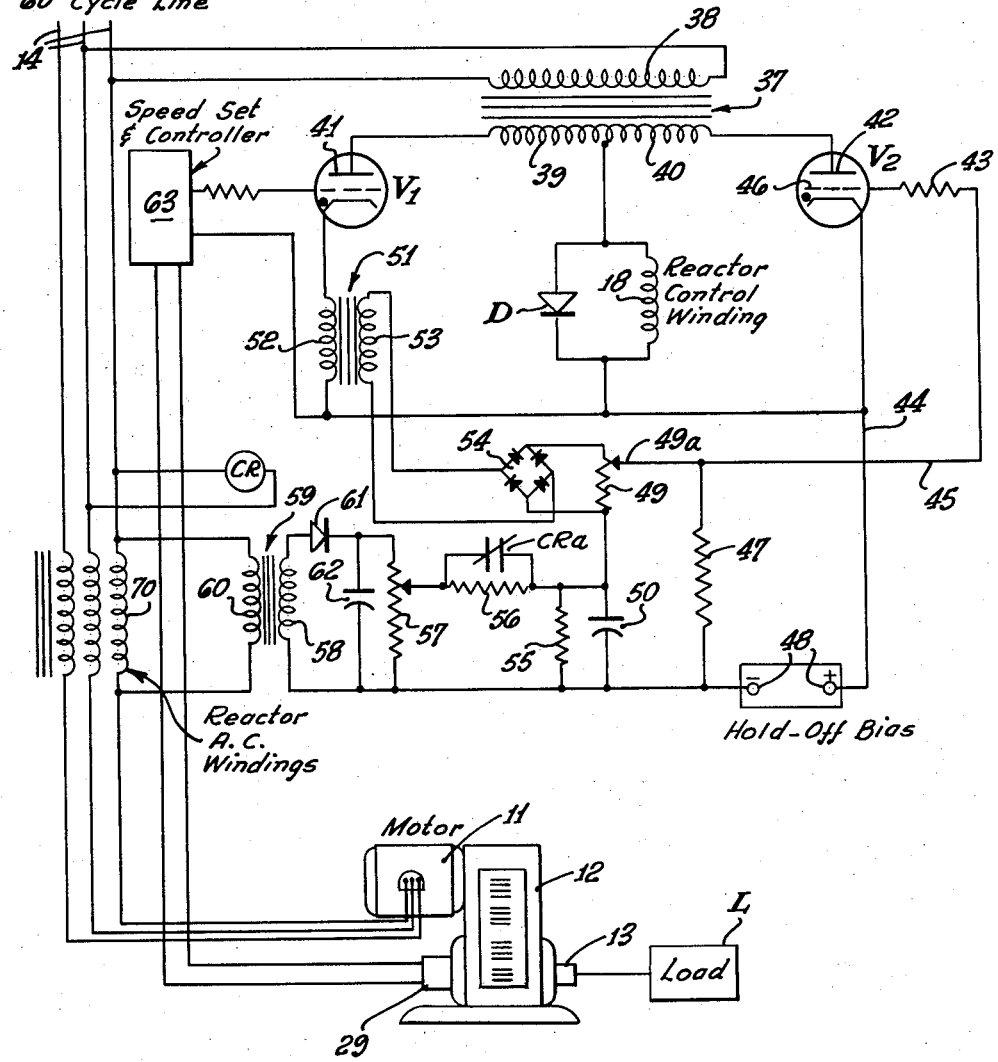

United States Patent Office 3,149,275
Patented Sept. 15, 1964

3,149,275
SYSTEM FOR IMPROVING THE STARTING TORQUE CHARACTERISTICS OF INDUCTION MOTORS
Robert J. Carlson, Orange, and Cornelis B. A. Wickenhagen, Lawndale, Calif., assignors, by mesne assignments, to Emerson Electric Co., a corporation of Missouri
Filed Jan. 4, 1960, Ser. No. 366
22 Claims. (Cl. 318—229)

This invention relates to induction motor controls, and especially to those employing saturable reactors in series with the motor leads.

More particularly, the invention is concerned with the starting of induction motors utilizing saturable reactors for controlling the rate of current supplied through the motor leads.

When using motors or more elaborate machines or applications, particularly variable speed drives, it is common practice to size the drive very closely to the required horsepower. In such cases, a good deal of information is known about the application, making such a thing practical. As a result of this close sizing of motor-to-load, temporary overloads of fifty to one hundred percent are not uncommon.

Such motors are usually started when the direct current saturation is at normal value. During the starting period, the motor temporarily draws a current greatly in excess of the normal running current. Thus, the current consumption at starting may be as much as five to eight times the normal current. This high current consumption at starting causes a large voltage drop across the reactors, reducing the starting torque to a low value. While unobjectionable to some loads, yet in many other applications a high starting torque, much above running torque, is required.

It is one of the objects of this invention to make it possible to increase the starting torque of motors equipped with saturable reactors.

The saturable reactors have been supplied of ample size to accommodate the heavy starting current, and are sized on the basis of the effective line voltage and the maximum current, even if the maximum be required only for a short interval corresponding to the starting of the motor.

When using saturable reactors to control an induction motor on a mechanical variable speed transmission such as one utilizing adjustable diameter pulleys, the mechanical advantage of the belt ratio may be used to keep the load on the motor small at the low speeds, which then allows the use of smaller saturable reactors. In addition, during starting, the belt ratio multiplies the motor torque when set for low speed so as to produce adequate starting torque at the output shaft even though the motor torque may be somewhat low during starting due to excessive drop across the reactors. However, should the variable speed transmission be stopped at a high speed setting without first being returned to the low speed setting, then the output shaft starting torque for the next start would be insufficient to start the load.

It is another object of this invention to make it possible to reduce the size of the reactors and yet obtain efficient starting characteristics.

In order to accomplish this result, the voltage applied to the direct current saturating winding is increased or forced to provide less voltage drop across the reactors during starting. In this way, the reactor is subjected to a heavy overload current only for a short time, thereby eliminating the danger of overheating. And due to the large saturating current, there is a corresponding increase in saturation, to some extent overcoming the effect of abnormally high motor current.

When using saturable reactors to control induction motor speed, these temporary overloads draw increased currents through the reactors, causing increased voltage drop, and lower voltage to the motor. If the reactors have been sized for the normal motor current, then these increased currents can produce excessive reactor voltage drop, which may produce motor pull-out. In such cases, temporary "forcing" of the reactor control winding during the overload period will increase the motor torque sufficiently to prevent motor pull-out.

Such conditions are produced by the following types of applications:

(a) When driving extruders, the material being handled may be cold to begin with, resulting in high loads on the motor. As the material warms, the load decreases to a normal value. However, lumps or other foreign material may momentarily cause high motor overload, requiring forcing for short durations.

(b) When driving pinch-rolls which reduce the size or thickness of material being handled, the load varies with the viscosity of the material as well as the amount of reduction in size. Very often the operator may adjust the rolls too close and cause overloads. Here also, variations in temperature or consistency can momentarily overload the drive motor requiring temporary forcing.

(c) When using reactor-controlled motors with a variable ratio transmission, the motor is sized to take advantage of the torque multiplying characteristics of the belts. In these cases, the motor may become temporarily overloaded if the speed-shifting mechanism is changed rapidly from low to high speed. This is particularly true when driving high inertia loads where the load cannot accelerate as fast as the speed control mechanism can be shifted. The result is that the belt ratio is changed to drive the load at high speed but the load is temporarily running at low speed, which causes the motor to run at low speed. This overloads the motor and reactors, requiring forcing to bring the drive up to speed.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 3 is a diagram, similar to FIG. 2, of a modified form of the invention.

Figure 1:
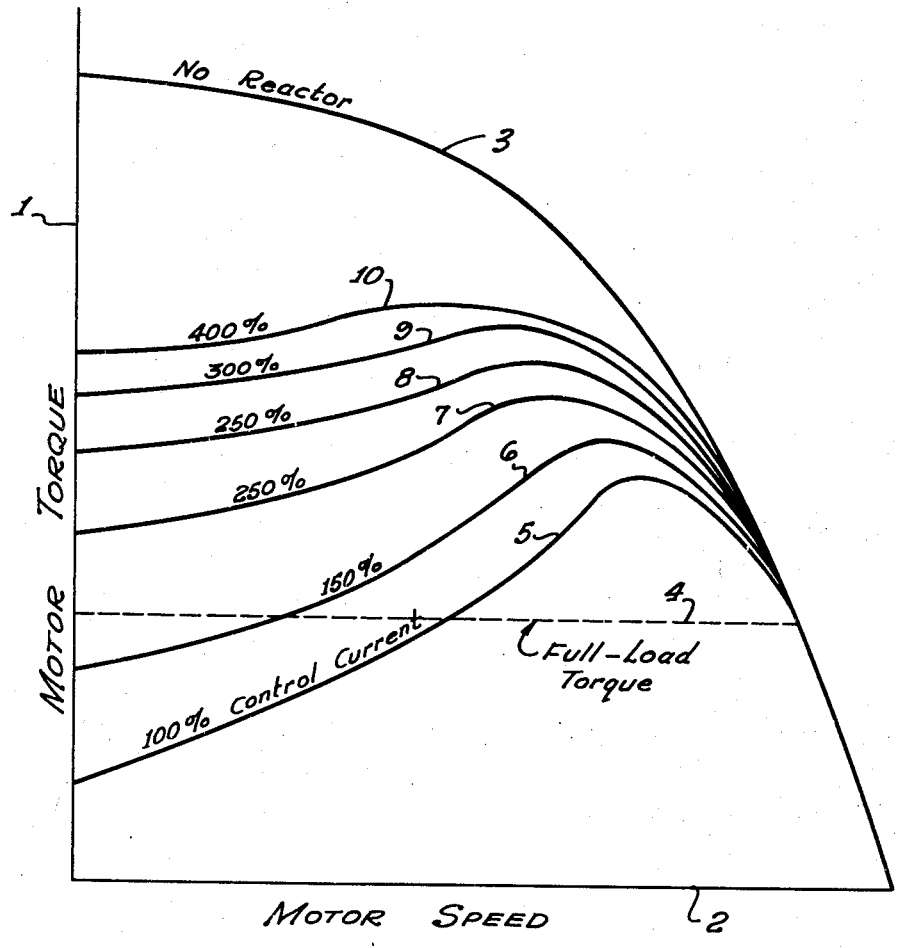
FIGURE 1 is a graph of a family of curves illustrating the effect upon starting torque of adjustments in the control current for a saturable reactor in series with an induction motor.

In FIG. 1, the ordinates of any of the curves correspond to motor torque, and the abscissae correspond to motor speed. These curves intersect the vertical line 1 at ordinates corresponding to the starting torque.

Curve 3 shows the gradual reduction of the torque from start to full-load speed when no reactor is utilized in the mains of the motor being controlled. The full-load torque is represented by the dotted horizontal line 4, parallel to the base line 2.

Curve 5 represents the first of a family of curves including the succeeding curves 6, 7, 8, 9 and 10. Curve 5 represents the variation in torque from start to full-load speed when the control winding for the reactor is provided with a normal or one hundred percent excitation. It is seen that the starting torque represented by the intersection of this curve with the vertical line 1 is very much less than that occurring in a motor having no series reactor.

Curve 3 shows that the starting torque with no reactor is about three times as great as the running torque.

Curves 6, 7, 8, 9 and 10 show the effect on the starting torque of successively greater energization of the control winding for the reactor. Thus, with four times the normal control current, as represented by curve 10, the starting torque approaches in value the starting torque that the motor would have without any reactor at all. When the motor comes up to normal speed, the control current may be returned to normal value. Accordingly, it is necessary to provide the "forcing" energizing current through the control winding only during the starting period in order to improve the starting torque.

Figure 2:
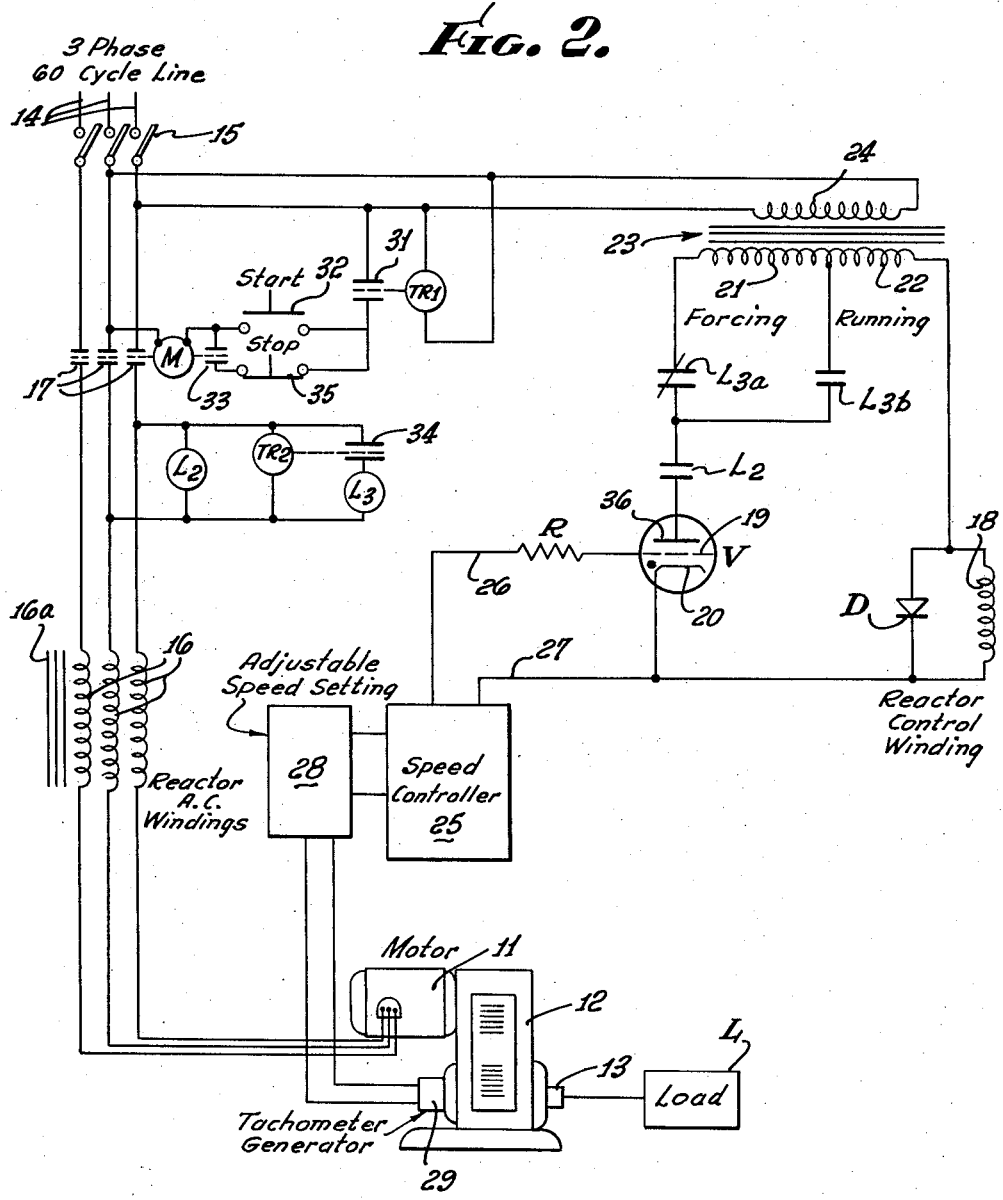
FIG. 2 is a diagram illustrating one form of the invention.

One such system is illustrated in FIG. 2. The electric motor 11 is arranged to drive a variable ratio transmission mechanism 12. This mechanism is intended to supply a load L through the output shaft 13. The mechanism 12 preferably comprises variable diameter pulleys, such as disclosed in Patent No. 2,398,235 issued April 9, 1946.

The motor 11 is fed from mains 14 through a circuit controller or switch 15 and reactor coils 16. Normally after the switch 15 is closed, a contactor M is arranged to close the switches 17 controlling the supply of current to the motor 11.

The reactor coils 16 are placed upon a core 16a carrying a saturating or reactor control winding 18, shown for convenience at the right-hand portion of the figure. This winding 18 is arranged to be fed through a thyratron V. This thyratron V serves to send half waves of current through the winding 18 whenever the potential of control electrode 19 exceeds that of cathode 20 and reaches a triggering definite value. This discharge, of course, is dependent upon the attainment of a positive potential of plate or anode 36 with respect to cathode 18. Accordingly, since the thyratron V is supplied from a source of alternating current (as hereinafter described), only half waves of current can pass through the thyratron V. Since this mode of operation of thyratrons is well understood, further description thereof is considered unnecessary.

The output circuit through the thyratron V includes the coil sections 21 and 22 comprising the secondary winding of a transformer 23. The primary winding 24 is adapted to be fed from the mains 14 upon closing of the switch 15.

The potential difference across the input electrodes 19 and 20 is determined by the aid of a speed controller 25 to which the input circuit leads 26 and 27 connect. The potential difference across the leads 26 and 27 is determined by a comparison with the adjustable speed-setting device 28. By appropriate adjustment of this device within limits, the adjusted value can be compared with the actual speed of the output shaft 13. One of the values to be compared is the potential difference corresponding to the speed of the tachometer 29 driven by the mechanism 12. By appropriate mechanical and electrical connections, the speed controller 25 impresses an input voltage upon the thyratron V which is a function of the difference between the adjusted speed setting and the voltage corresponding to the tachometer output. A resistance R may be included in the input circuit for the thyratron. In order to keep the motor losses at a reasonable value, the motor 11 is designed to permit a relatively large slip without exceptional loss of efficiency.

During normal running, after the motor 11 has come up to speed, the electromotive force generated by the right-hand secondary coil section 22 alone is sufficient effectively to provide current pulses through thyratron V, normally open relay contacts L2, L3b, coil 22, winding 28, back to the thyratron V. The contacts L2, L3b, as hereinafter described, are placed in closed position during normal or full-speed operation.

During the forcing or starting period, both coils 21 and 22, comprising the entire secondary winding of transformer 23, are effective to increase the potential difference impressed across the winding 18. Under such starting conditions, the output circuit for the thyratron V includes normally open contact relay L2, normally closed relay contact L3a, coils 21 and 22, winding 18, back to the thyratron V.

How this change in connections is effected will now be described.

Upon first closing the switch 15, time delay relay TR1 is energized. After a definite time interval after energization, this time delay relay TR1 closes its contacts 31. The delay in closing of contacts 31 ensures that the cathode 20 for the thyratron V will be brought up to operating temperature before the start button 32 may be effective to start the motor.

When the start button 32 is depressed, this momentarily closes the circuit including contacts 31, through the contactor M which, in turn, closes the switches 17 as well as a switch 33 providing a holding circuit for the contactor M.

As soon as the switches 17 are closed, the relay L2 is energized. The relay L3, however, is not energized until after a predetermined interval of time as determined by the time delay TR2. Contacts L3a remain closed, and contacts L3b remain open. Accordingly, during the interval determined by the delay, the output circuit for the thyratron V includes both coils 21 and 22, via contacts L2 and L3a. As soon as relay TR2 closes the contacts 34, only the coil 22 is effective to impress an electromotive force across the control winding 18, because now contacts L3a open, and contacts L3b close.

In order to stop the operation of the motor, the stop button 35 is depressed in order to open the holding circuit for the contactor M.

In the form illustrated in FIG. 2, half cycles of current pass to the control winding 18 when the plate electrode 36 is positive with respect to the cathode 20. Accordingly, half wave rectification is provided by the thyratron V, and such pulses are utilized in the control winding 18. When the thyratron V becomes inactive, the back diode D provides a path for the collapsing current in winding 18.

In the form shown in FIG. 3, two thyratrons V1 and V2 are connected in opposite phases to the terminals of the secondary winding transformer 37. Accordingly, full-wave rectification is obtained when both of the thyratrons are in operation.

The primary winding 38 is energized from the mains 14 when the motor is started through relays such as disclosed in connection with FIG. 2. The secondary coil sections 39 and 40 are respectively in the output circuits of thyratrons V1 and V2.

Thyratron V1 is operated generally in the same manner as the thyratron V of the form shown in FIG. 2. The plate electrodes or anodes 41 and 42 of the thyratrons V1 and V2 are in opposite phases with respect to winding 39, 40. Accordingly, alternate half-cycles of current pass through the thyratrons.

The input circuit for the thyratron V2 includes the control electrode 46, resistance 43, and connections 44 and 45. Influencing the control electrode 46 is the potential drop across the resistance 47 and the hold-off negative bias represented by the terminals 48. Any appropriate adjustable source of potential is represented by the block disposed around terminals 48. Accordingly, in order to fire the thyratron V2, the voltage drop across the resistance 47 must be sufficiently greater than the hold-off bias potential to cause discharge through the thyratron V2.

The hold-off bias is purposely so chosen as to render the operation of the thyratron V2 effective only during the starting period. For this purpose, use is made of the potential drop across the resistance 47, opposing the hold-off bias.

The potential difference across the resistance 47 is made up of two components. One of them is that represented by the drop derived from the potentiometer resistance 49, and as determined by the adjustable contact 49a. The other component is the potential difference across the plates of a condenser 50.

In order to pass a current through the resistance 49 to obtain the first component of this potential difference, use is made of a transformer 51 having a primary winding 52 in the output circuit of the thyratron V1. The secondary winding 53 is connected to a full-wave rectifier 54, the output of which is connected across the resistance 49. Obviously, secondary winding 53 senses any fluctuations in the current passing through thyratron V1.

Accordingly, it is only when the output of thyratron V1 consists of pulsatory current through the primary coil 52 is there any electromotive force induced in secondary 53, and consequently a potential difference across the resistance 49. The secondary winding 53 thus senses when the thyratron V1 is active.

The condenser 50 is charged by the potential difference across the resistance 55. This resistance 55 is placed in series with a normally short-circuited resistance 56 and across a section of a potentiometer resistance 57. The short-circuiting of resistance 56 is accomplished by normally closed relay contacts CRa.

The potentiometer 57 is connected to the secondary winding 58 of a transformer 59. Primary winding 60 is connected across one of the reactors 70 in the motor leads.

During the starting period, the electromotive force across the reactor 70 is quite large, and accordingly, there is a large electromotive force induced in the secondary coil 58. The current through the secondary is rectified by the rectifier 61 and supplies current to the potentiometer 57. A filtering condenser 62 bridges the resistance 57.

At the starting of the motor 11, the potential drop across the resistance 47 is at a maximum. Thyratron V1 is active, and accordingly, the potential difference contributed by resistance 49 is large; and the drop across condenser 50 is also large and corresponds to the drop across a section of potentiometer resistance 57. As soon as the motor 11 is energized, the relay CR opens the contacts CRa which bridge the resistance 56. Accordingly, the potential drop across the resistance 55 is reduced, and the condenser 50 gradually discharges through that resistance. There is, accordingly, a gradual reduction in that component of the electromotive force across the resistance 47 which is due to the charge on the condenser 50. After a short interval, this reduction is sufficient to render the thyratron V2 ineffective. When this happens, the sole source of current for winding 18 are the half-waves passing through the thyratron V1 and the secondary winding 39.

The speed set and controller 63 which controls the operation of the thyratron V1 serves also to control the speed of the motor 11 within narrow limits in a manner now well understood. Should there be a reduction in the speed below a definite value, the thyratron V1 is fired and causes the control winding 18 to be energized.

Should the motor 11 reach a set speed during the forcing time, the thyratron V1 will be conducting in a discontinuous manner and will be controlled by the speed controller device 63. This causes a fluctuation of the voltage across the resistance 47, resulting in interrupted conduction of the thyratron V2. Both thyratrons are then influenced by the speed controller 63 until condenser 50 is discharged to its final value. This value, when the drop produced by the resistance 49 is at a maximum, is insufficient to fire thyratron V2.

The inventors claim:

1. In a system for increasing the starting torque of induction motors: an induction motor; a saturable reactor through which the motor is provided with operating current; a direct current control winding for the reactor; switching means operable in response to departure in motor speed from a desired value for supplying direct current of normal regulatory value to said control winding while the motor is operating at speeds neighboring synchronous speed; and means for increasing said direct current to said control winding substantially above said regulatory value only during the starting period of said motor.

2. In a system for increasing the starting torque of induction motors: an induction motor; a saturable reactor through which the motor is provided with operating current; a direct current control winding for the reactor; switching means operable in response to departure in motor speed from a desired value for supplying direct current of normal regulatory value to said control winding while the motor is operating at speeds neighboring synchronous speed; means for increasing said direct current to said control winding substantially above said regulatory value only during the starting period of said motor; and means operating to terminate said increase in direct current when the motor attains normal speed.

3. In combination: an induction motor; a saturable reactor through which the motor is supplied with operating current; a direct current control winding for the reactor; switching means operable in response to departure in motor speed from a desired value for supplying a normal operating current to the control winding; means for increasing the saturation of the reactor; and time delay means effective upon starting the motor, for determining the period when the increase is effective.

4. The combination as set forth in claim 2, in which the means for temporarily increasing the saturation includes a thyratron circuit triggered while the speed of the motor output is below a set value, as well as a time delay circuit effective upon starting of the motor to determine the period of increased saturation.

5. In combination: an induction motor having an operating speed range; a saturable reactor through which the motor is supplied with operating current; direct current winding means for saturating said reactor; a first energization circuit for said direct current winding including a controllable switch; means for comparing the speed of the motor with a reference standard for causing the controllable switch to operate; a second energization circuit for said direct current winding; means for operating said second energization circuit when said motor is operating below its operating speed range; and means determining the period during which the operating means for said second energization circuit is effective.

6. The combination as set forth in claim 5, in which the said period is determined by a time delay relay.

7. In a control system: an induction motor; a saturable reactor through which operating current is supplied to the motor; winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means responsive to the speed of the motor output for rendering the first thyratron active upon a reduction in speed; and means for temporarily rendering the second thyratron active only during the starting period.

8. The combination as set forth in claim 7, in which the input circuit for the second thyratron includes a circuit element, the potential drop across which is included in said input circuit; and means responsive to current flow in the output circuit of the first thyratron for contributing to the said potential drop.

9. The combination as set forth in claim 7, in which the input circuit for the second thyratron includes a circuit element, the potential drop across which is included in said input circuit; and a transformer having a primary winding in the output circuit of the first thyratron and a secondary winding contributing to the said potential drop.

10. In a control system: an induction motor; a saturable reactor through which operating current is supplied to the motor; winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means responsive to the speed of the motor output for rendering the first thyratron active upon a reduction in speed; and means for temporarily rendering the second thyratron active during the starting period, including means responsive to the electromotive force across the reactor for providing a potential difference in the input circuit of the second thyratron.

11. The combination as set forth in claim 10, in which a capacity is used across which the potential difference exists; and means responsive to the starting of the motor for gradually discharging the capacity to a lower potential difference for rendering the second thyratron inactive.

12. The combination as set forth in claim 7, in which the input circuit for the second thyratron includes a circuit element, the potential drop across which is included in said input circuit; means responsive to current flow in the output circuit of the first thyratron for contributing to the said potential drop; and means effective during the starting period for also contributing to the said potential drop.

13. The combination as set forth in claim 10, in which a capacity is used across which the potential difference exists; means responsive to the starting of the motor for gradually discharging the capacity to a lower potential difference for rendering the second thyratron inactive; and a transformer having a primary winding in the output circuit of the first thyratron, and a secondary winding also contributing to said input circuit potential difference.

14. In a control system: an induction motor; a saturable reactor through which operating current is supplied to the motor; winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means responsive to the speed of the motor output for rendering the first thyratron active upon a reduction in speed; and means for temporarily rendering the second thyratron active during only the starting period until the motor speed attains a predetermined value.

15. The combination as set forth in claim 7, with the addition of a variable ratio transmission mechanism driven by the motor.

16. In combination: an induction motor having an operating speed range; a variable ratio transmission mechanism driven by the motor; a saturable reactor through which the motor is supplied with operating current; a direct current control winding for the reactor; switching means operable in response to departure in motor speed from a desired value for supplying a normal operating current to the control winding; and means operated when the motor speed is substantially below its operating speed range for increasing the saturation of the reactor; said variable ratio transmission utilizing belt shifting, causing temporarily, by load inertia, a demand for more torque than the motor can deliver as the ratio of the output speed to the input speed of the mechanism is being increased, said saturable reactor control current then acting temporarily to increase the motor torque until the motor speed attains a normal value.

17. In a control system: an induction motor; a saturable reactor through which operating current is supplied to the motor; winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means responsive to the speed of the motor output for rendering the first thyratron active upon a reduction in speed; and means responsive to momentary overload on the motor for energizing the second thyratron, including means creating an input potential for the second thyratron, including potentials corresponding respectively to the fluctuations in output current of the first thyratron, and to the potential drop across the reactor.

18. In a control system: an induction motor; a saturable reactor through which is provided an operating current to the motor; direct current winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means whereby the first thyratron becomes intermittently active for causing half-wave unidirectional energy to be supplied to the direct current winding for regulating the speed of the motor; an input circuit for the second thyratron including a hold-off bias, as well as two circuit elements creating direct-current potential differences opposed to the bias, one circuit element being responsive to the drop across the reactor, and the other element to the activity of the first thyratron; and means whereby the said potential differences decrease to below the hold-off bias upon attainment of the motor speed to a normal value.

19. In a control system: an induction motor; a saturable reactor through which is provided an operating current to the motor; direct current winding means for saturating said reactor; a pair of thyratrons, each having input and output electrodes; means for supplying respectively opposite phase alternating current potentials between the input electrodes of the thyratrons; output circuits for the thyratrons for supplying full-wave current to the winding means; means whereby the first thyratron becomes intermittently active for causing half-wave unidirectional energy to be supplied to the direct current winding for regulating the speed of the motor; an input circuit for the second thyratron; said input circuit including a hold-off bias, a resistance in series, and means for causing a potential difference across the resistance that opposes the hold-off bias and causes energization of the second thyratron only when the motor accelerates from starting position.

20. The combination as set forth in claim 19, in which the potential difference across the resistance is at least partially produced by means for deriving a potential corresponding to the current in the reactor, and a capacitor charged by said potential.

21. The combination as set forth in claim 19, in which the potential difference across the resistance is at least partially produced by means for deriving a potential corresponding to the current in the reactor, and a capacitor charged by said potential; and with the addition of a discharge resistance bridging the capacitor, and means responsive to the energization of the motor for reducing the potential impressed across the capacitor, whereby the capacitor discharges through the bridging resistance and causes the resistance drop opposing the hold-off bias to be insufficient to fire the second thyratron.

22. In a system for increasing the starting torque of induction motors: an induction motor; a saturable reactor through which the motor is provided with operating current; a direct current control winding for the reactor; switching means operable in response to departure in motor speed from a desired value for supplying direct current of normal regulatory value to said control winding while the motor is operating at speeds neighboring synchronous speed; and means for increasing said direct current to said control winding to at least twice said regulatory value only during the starting period of said motor.

References Cited in the file of this patent

UNITED STATES PATENTS

| | | |
|---|---|---|
| 2,462,751 | Koehler | Feb. 23, 1949 |
| 2,676,292 | Spencer | Apr. 20, 1954 |